(12) United States Patent
Osaka

(10) Patent No.: US 6,481,852 B2
(45) Date of Patent: Nov. 19, 2002

(54) PROJECTOR APPARATUS COMPRISING A LIGHT COMPOSING OPTICAL SYSTEM VERTICALLY STACKED WITH RESPECT TO A LIGHT SEPARATION OPTICAL SYSTEM

(75) Inventor: Akihiro Osaka, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/797,844

(22) Filed: Mar. 5, 2001

(65) Prior Publication Data

US 2001/0019396 A1 Sep. 6, 2001

(30) Foreign Application Priority Data

Mar. 6, 2000 (JP) ......................... 2000-060679

(51) Int. Cl.$^7$ ................. G03B 21/00; G03B 21/14; G03B 21/26; G03B 21/28; G02F 1/1335

(52) U.S. Cl. ............... 353/31; 353/33; 353/20; 353/34; 353/37; 353/81; 353/99; 349/5; 349/8; 349/9

(58) Field of Search ............... 353/20, 30, 31, 353/32, 33, 34, 37, 38, 81, 82, 98, 99, 102; 349/5, 6, 7, 8, 9, 16; 359/490

(56) References Cited

U.S. PATENT DOCUMENTS

| | | | | |
|---|---|---|---|---|
| 5,959,778 A | * | 9/1999 | Shimonura et al. | 359/618 |
| 6,067,128 A | * | 5/2000 | Imai | 349/8 |
| 6,174,060 B1 | * | 1/2001 | Imaoka et al. | 353/31 |
| 6,176,583 B1 | * | 1/2001 | Sawai | 353/20 |
| 6,188,524 B1 | * | 2/2001 | Hayashi et al. | 359/651 |
| 6,283,567 B1 | * | 8/2001 | Conner et al. | 353/20 |

FOREIGN PATENT DOCUMENTS

| | | | |
|---|---|---|---|
| JP | 5158167 | A2 | 12/1991 |
| JP | 10171045 | A2 | 12/1996 |

* cited by examiner

Primary Examiner—Russell Adams
Assistant Examiner—Melissa Koval
(74) Attorney, Agent, or Firm—Whitham, Curtis & Christofferson, PC

(57) ABSTRACT

A projector apparatus comprises: a light modulation optical system which separates white light into a plurality of light components with respective wavelength bands, controls the intensity of each of the plurality of light components, and then composes the controlled plurality of light components; a projection lens for projecting the light composed in the light modulation optical system; a light source optical system for permitting the white light to exit therefrom, the light source optical system being disposed so that the optical axis of the light source optical system is displaced relative to the optical axis of the light modulation optical system; and a focusing lens which is disposed so that the optical axis of the focusing lens is coincident with the optical axis of the light modulation optical system, for focusing the light output from the light source optical system and inputting the focused light into the light modulation optical system. By virtue of this construction, the projector apparatus can realize a small apparatus size, a thin apparatus thickness and projected images which have high illuminance and have no significant color shading.

25 Claims, 4 Drawing Sheets

D: DISPLACEMENT
T: THICKNESS
1: LIGHT MODULATION OPTICAL SYSTEM
100: OPTICAL SYSTEM FOR LIGHT SOURCE
100x: OPTICAL AXIS
111: LIGHT SOURCE
112: CONCAVE MIRROR
120: 1ST INTEGRATOR
130: 2ND INTEGRATOR
140: POLARIZATION LIGHT CONVERTER
150: FOCUSING LENS
150x: OPTICAL AXIS
200: COLOR SEPARATING OPTICAL SYSTEM
200x: OPTICAL AXIS
240: CROSS DICHROIC MIRROR
250: LIGHT GUIDE OPTICAL SYSTEM
253: REFLECTING MIRROR
254: REFLECTING MIRROR
262: REFLECTING PRISM
400: COLOR COMPOSING OPTICAL SYSTEM
412: CONDENSER LENS
422: POLARIZER
432: LIGHT VALVE
442: ANALYZER
450: CROSS DICHROIC PRISM
460: PROJECTION LENS
460p: ENTRANCE PUPIL
500: RELAY OPTICAL SYSTEM
510: 1ST RELAY LENS
522: 2ND RELAY LENS

PROJECTOR APPARATUS COMPRISING A LIGHT COMPOSING OPTICAL SYSTEM VERTICALLY STACKED WITH RESPECT TO A LIGHT SEPARATION OPTICAL SYSTEM

FIELD OF THE INVENTION

The invention relates to a projector apparatus, and more particularly to a projector apparatus which separates white light into light components of the primary colors, modulates the separated light components, and then composes the modulated light components.

BACKGROUND OF THE INVENTION

There are various conventional projector apparatuses for projecting images according to image signals. These projector apparatuses are classified into a system wherein white light from a light source is passed through a full-color light modulator followed by projection, and a system wherein white light from a light source is separated into light components or the three primary colors which are passed through respective light modulators and then composed, followed by projection. The invention belongs to the latter system.

Japanese Patent Laid-Open No. 171045/1998 discloses a projector apparatus which separates light using two dichroic mirrors and composes the separated light components using a cross-dichroic prism. Technique described in this publication will be explained as a first example of prior art.

Figure 3:
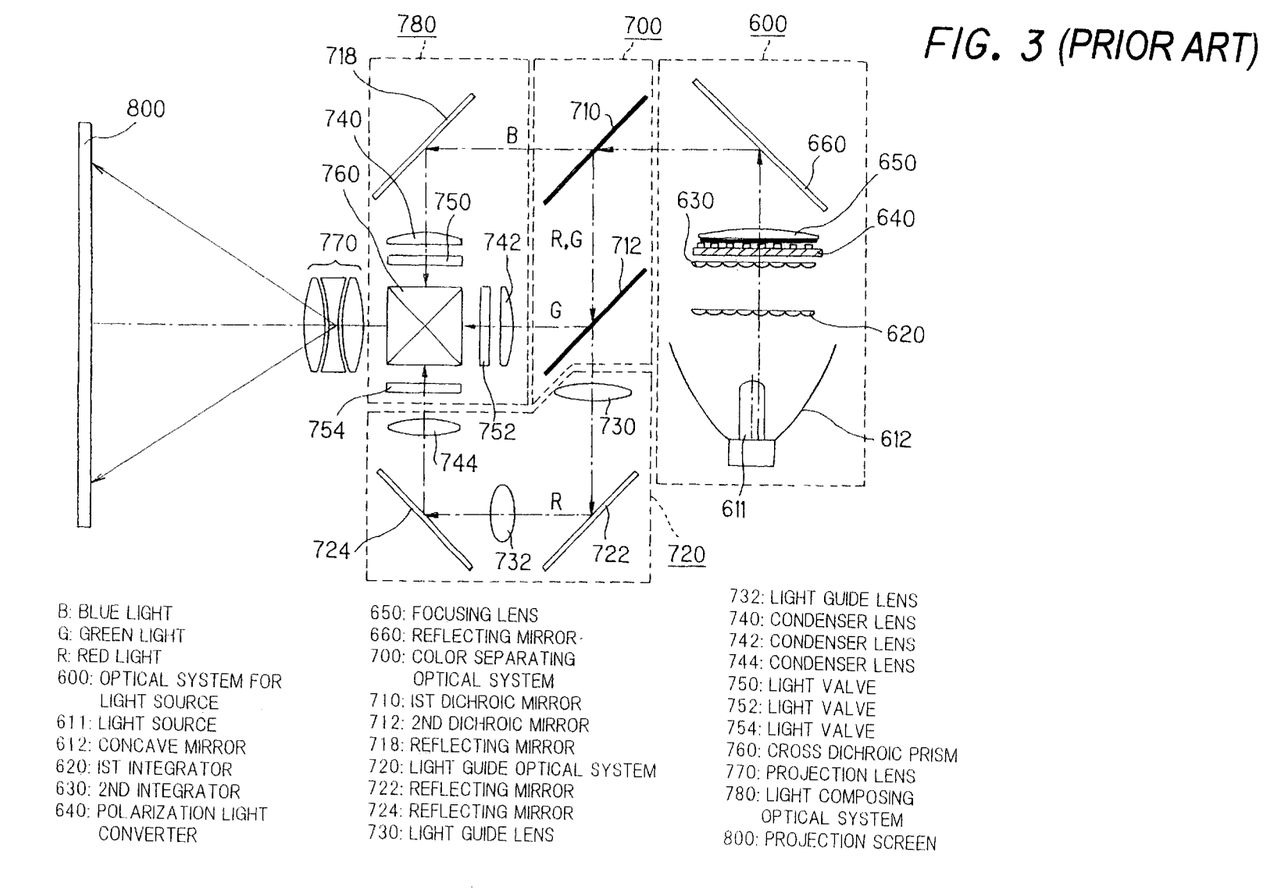
FIG. 3 is a side view illustrating the structure of the projector apparatus according to a first example of the prior art.

FIG. 3 is a side view illustrating the structure of the first example of the conventional projector apparatus.

The projector apparatus shown in FIG. 3 comprises a light source optical system 600, a light separating optical system 700, a light guide optical system 720, a light composing optical system 780, an projection lens 770.

Light having random polarization components emitted from a light source 611 is reflected from a concave mirror 612 and then enters first and second integrators 620, 630.

The first and second integrators 620, 630 each comprise a number of minute rectangular lenses, which have been continuously arranged in a planar matrix form, and function to homogenize the illuminance distribution of the incident light and then to output the homogenized light.

The polarization light converter 640 arranges the light, output from the first and second integrator, in a specific linear polarization direction and outputs the arranged light. This light from the light source 611 is then passed through a focusing lens 650 and a reflecting mirror 660 and is applied to irradiation areas near light valves 750, 752 and a light guide lens 730.

A first dichroic mirror 710 reflects red light and green light components among the components of the incident light, and permits only a blue light component to be passed therethrough. The transmitted blue light component is passed through a reflecting mirror 718, a condenser lens 744, and a light valve 750 in that order, and then enters a cross-dichroic prism 760.

The second dichroic mirror 712 permits the transmission of only the red light component out of the red light and green light components as the incident light, and reflects only the green light component. The reflected green light component is passed through the condenser lens 742 and the light valve 752 in that order, and then enters the cross-dichroic prism 760.

On the other hand, the red light component passed through the second dichroic mirror 720 is passed through a light guide lens 730, a reflecting mirror 722, a light guide lens 734 a reflecting mirror 724, a condenser lens 744, and a light valve 754 in that order, and then enters the cross-dichroic prism 760.

The red light, green light, and blue light components input into the cross-dichroic prism 760 are composed to form a full-color image which is then projected in an enlarged manner onto a projection screen 800 through a projection lens 770.

Thus, the projector apparatus as the first example of the prior art has a structure such that light components of the three primary colors are introduced into the second cross-dichroic prism 760 from three sides around the second cross dichroic prism 760 to compose the introduced light components.

Japanese Patent Laid-Open No. 158167/1993 discloses a projector apparatus which separates light using a cross-dichroic mirror and composes the separated light components using another cross-dichroic mirror. The technique described in this publication will be explained as a second example of prior art.

Figure 4:
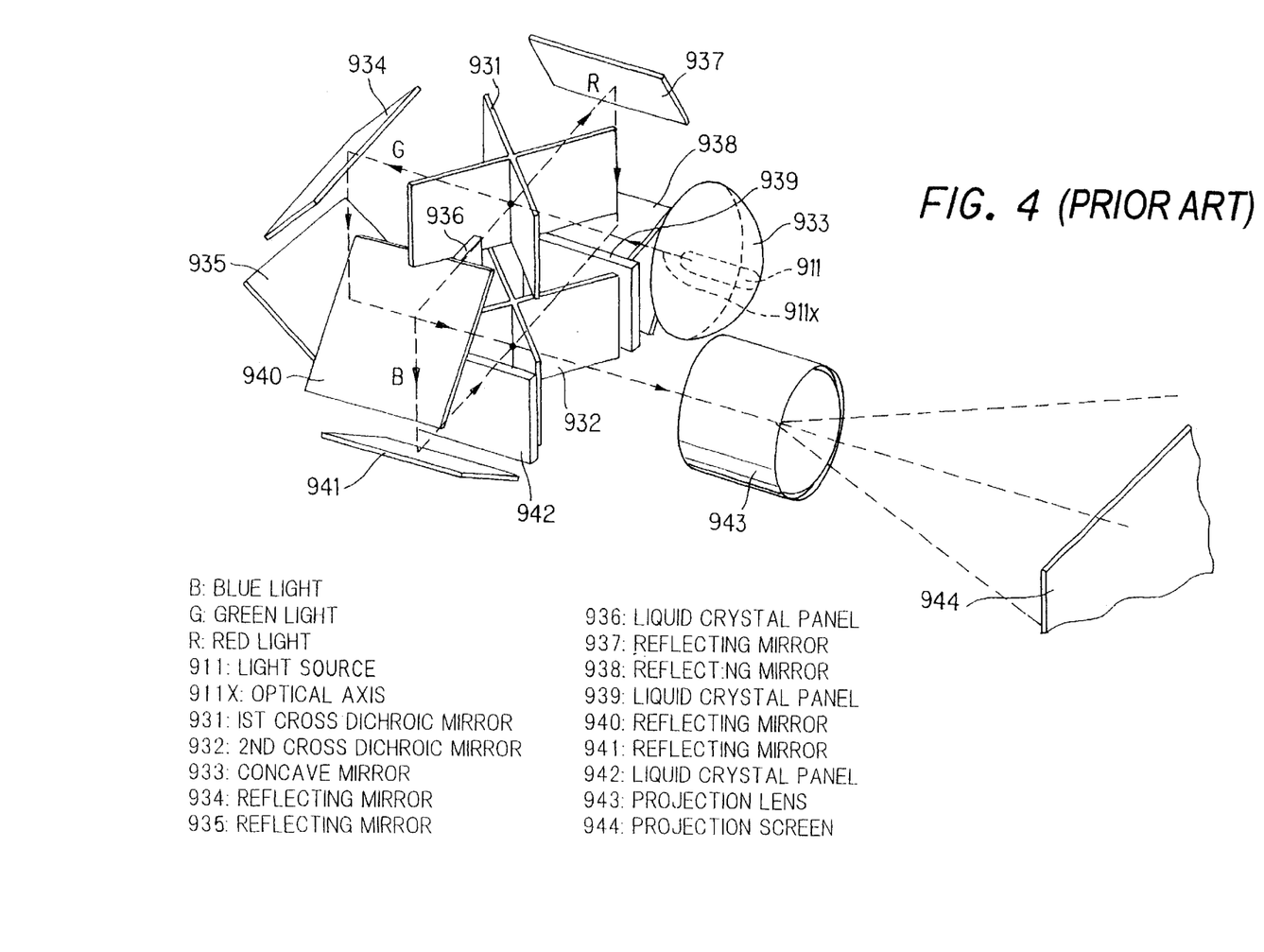
FIG. 4 is a perspective view illustrating the structure of the projector apparatus according to a second example of the prior art.

FIG. 4 is a perspective view illustrating the structure of the second example of the conventional projector apparatus.

The projector apparatus shown in FIG. 4 comprises a light source 911, a concave mirror 933, a first cross-dichroic mirror 931, reflecting mirrors 934, 935, 937, 938, 940, 941, liquid crystal panels 936, 939, 942, a second cross-dichroic mirror 932, and a projection lens 943.

Light having random polarization components emitted from the light source 911 is reflected from the concave mirror 933 and then enters the first cross-dichroic mirror 931.

The first cross-dichroic mirror 931 comprises a combination of a red transmission cross-dichroic mirror and a blue transmission cross-dichroic mirror which each are disposed on the optical axis 911x of the light source 911 so as to be inclined at 45 degrees to the optical axis 911x and to be orthogonal to each other and functions to separate white light from the light source 911 into light components of the three primary colors, red light, green light, and blue light components.

A pair of reflecting mirrors 934 and 935, a pair of reflecting mirrors 937 and 938, and a pair of reflecting mirrors 940 and 941 are disposed respectively on the optical paths of green light, red light, and blue light components to bend each of the optical paths to form a " ⊃ " shape.

The second cross-dichroic mirror 932 comprises a combination of a red reflection dichroic mirror and a blue reflection dichroic mirror which each are disposed so as to be inclined at 45 degrees to the output optical axis and to be disposed orthogonal to each other. The second cross-dichroic mirror 932 is disposed just under and adjacent to the first cross-dichroic mirror 931, and composes the green light, red light, and blue light components reflected by the reflecting mirrors 935, 938, 941 to form a full-color light which is then output.

The full-color light composed by the second cross-dichroic mirror 932 is projected as a projection image by the projection lens 943 onto the projection screen 944.

Thus, in the projector apparatus according to the second example of the prior art, the adoption of a structure, wherein the first and second cross-dichroic mirrors 931, 932 are put on top of the other respectively as upper and lower cross-dichroic mirrors so as to be adjacent to each other, has eliminated the need to provide the light guide optical system 720 in the projector apparatus according to the first example of the prior art.

The projector apparatuses according to the above examples of the prior art, however, had the following problems.

In the projector apparatus according to the first example or the prior art, the light components of the three primary colors should be introduced from the three sides around the second cross-dichroic prism 760. Therefore, the provision of the light guide optical system 720 is indispensable for the structure.

Since, however, the optical path length of the red light component passed through the light guide optical system 720 is different from the optical path lengths of the green light and blue light components not passed through the light guide optical system 720, the illuminance distribution on a light valve 733 on the optical path of the red light component is unfavorably different from the illuminance distributions on light valves 731, 732 on the light paths of the green light and blue light components. Consequently, when white is displayed on the whole projection screen, a problem of color shading occurs, that is, there is a difference in color between the center portion of the projected image on the projection screen 800 and the periphery of the projected image.

Likewise, since the quantity of the red light component incident to the projection lens 770 is different from the quantity of the green light and blue light components, when white is displayed on the whole projection screen 800, a problem of color shading occurs in the projected image on the projection screen 800.

Unlike the first example of the prior art, the projector apparatus as the second example of the prior art does not have the light guide optical system 720 and thus does not pose the above problem. Instead, however, since the structure, wherein the first and second cross-dichroic mirror 931, 932 are vertically put on top of the other, is indispensable for the projector apparatus as the second example of the prior art, a light source having a large volume should be disposed adjacent to these cross-dichroic mirrors. This poses a problem of an increased height of the projector apparatus.

Further, since the projector apparatus as the second example of the prior art does not have any optical device for homogenizing the illuminance distribution, such as integrators, in the light source section, the illuminance distribution of the projection screen 944 is heterogeneous, that is, such that the center portion is bright while the peripheral portion is dark.

SUMMARY OF THE INVENTION

Accordingly, it is an object of the invention to provide a projector apparatus which is small and thin and can produce projected images having high illuminance and having no significant color shading.

The above object can be attained by the following features.

According to the first feature of the invention, a projector apparatus comprises:
a light modulation optical system (1 in FIG. 2) which separates white light into a plurality of light components with respective wavelength bands, controls the intensity of each of said plurality of light components, and then composes the controlled plurality of light components;
a projection lens (460) for projecting the light composed in the light modulation optical system (1);
a light source optical system (100) for permitting the white light to exit therefrom, the light source optical system (100) being disposed so that the optical axis (10x) of the light source optical system (100) is displaced relative to the optical axis (200x) of the light modulation optical system (1); and
a focusing lens (150) which is disposed so that the optical axis (150x) of the focusing lens is coincident with the optical axis (200x) of the light modulation optical system (1), for focusing the light output from the light source optical system (100) and inputting the focused light into the light modulation optical system (1).

According to the second feature of the invention, a projector apparatus comprises;
a light separating optical system (200 in FIG. 2) which separates white light into a plurality of light components with respective wavelength bands;
a light guide optical system (250) for bending the optical paths of said plurality of light components, which have been output from the light separating optical system (200), so as to form a " ⊃ " shape;
a light composing optical system (400) which is disposed adjacent to the light separation optical system (200) and composes the plurality of light components output from the light guide optical system (250);
light modulators (431 to 433) which are disposed respectively on optical paths between the light separating optical system (200) and the light composing optical system (400) to control the intensity of the plurality of light components;
a projection lens (460) for projecting the light composed in the light composing optical system (400);
a light source optical system (100) for permitting the white light, which has been polarized in a specific polarization direction, to exit therefrom, the light source optical system being disposed so that the optical axis (100x) of the light source optical system (100) is displaced relative to the optical axis (200x) of the light separating optical system (200); and
a focusing lens (150) which is disposed so that the optical axis (150x) of the focusing lens is coincident with the optical axis (200x) of the light separating optical system (200), for focusing the light output from the light source optical system (100) and inputting the focused light into the light separating optical system (200).
Preferably, the projector apparatus may further comprise: a first relay lens (510) disposed between the focusing lens (150) and the light separating optical system (200); and a second relay lens (521 to 523) disposed between the light separating optical system (200) and the light modulators (431 to 433).

Thus, according to the projector apparatus of the invention, the light guide optical system is provided on all the optical paths of the three primary colors so that, for all the three primary colors, the optical path length and the structure of the optical systems on the optical paths are identical Therefore, the occurrence of color shading can be prevented even at the time of the display of white on the whole projection screen.

The provision of the relay optical system can enhance the efficiency for light utilization, and thus can enhance the illuminance of projected images as compared with the projector apparatus according to the first example of the prior art.

The vertical displacement of the optical axis of the light source optical system relative to the optical axis of the light separating optical system enables the height of the projector apparatus to be reduced to the sum of the height of the light separating optical system and the height of the light composing optical system, and thus can significantly reduce the thickness of the projector apparatus as compared with the projector apparatus according to the second example of the prior art.

BRIEF DESCRIPTION OF THE DRAWINGS

The invention will be explained in more detail in conjunction with the appended drawings, wherein.

REFERENCE NUMERALS IN DRAWING

B: BLUE LIGHT
D: DISPLACEMENT
G: GREEN LIGHT
I: LIGHT MODULATION OPTICAL SYSTEM
R: RED LIGHT
T: THICKNESS
100: OPTICAL SYSTEM FOR LIGHT SOURCE
100x: OPTICAL AXIS
110: OPTICAL SYSTEM FOR LIGHT SOURCE
111: LIGHT SOURCE
112. CONCAVE MIRROR
120: 1ST INTEGRATOR
130: 2ND INTEGRATOR
140: POLARIZATION LIGHT CONVERTER
150: FOCUSING LENS
150x: OPTICAL AXIS
171: REFLECTING PRISM
172: REFLECTING PRISM
200: COLOR SEPARATING OPTICAL SYSTEM
200x. OPTICAL AXIS
240: CROSS DICHROIC MIRROR
250: LIGHT GUIDE OPTICAL SYSTEM
253: REFLECTING MIRROR
254: REFLECTING MIRROR
261: REFLECTING PRISM
262: REFLECTING PRISM
263: REFLECTING PRISM
400: COLOR COMPOSING OPTICAL SYSTEM
411: CONDENSER LENS
412: CONDENSERLENS
413: CONDENSERLENS
421: POLARIZER
422: POLARIZER
423: POLARIZER
431: LIGHT VALVE
432: LIGHT VALVE
433: LIGHT VALVE
441: ANALYZER
442: ANALYZER
443: ANALYZER
450: CROSS DICHROIC: PRISM
460: PROJECTION LENS
460p: ENTRANCE PUPL
500: RELAY OPTICAL SYSTEM
510: 1ST RELAY LENS
522: 2ND RELAY LENS
523: 2ND RELAY LENS
600: OPTICAL SYSTEM FOR LIGHT SOURCE
611. LIGHT SOURCE
612: CONCAVE MIRROR
620: 1ST INTEGRATOR
630: 2ND INTEGRATOR
640: POLARIZATION LIGHT CONVERTER
650: FOCUSING LENS
660: REFLECTING MIRROR
700: COLOR SEPARATING OPTICAL SYSTEM
710: 1ST DICHROIC MIRROR
712: 2ND DICHROIC MIRROR
718: REFLECTING MIRROR
720: LIGHT GUIDE OPTICAL SYSTEM
722: REFLECTING MIRROR
724: REFLECTING MIRROR
730: LIGHT GUIDE LENS
732: LIGHT GUIDE LENS
740: CONDENSER LENS
742: CONDENSER LENS
744: CONDENSER LENS
750: LIGHT VALVE
752: LIGHT VALVE
754: LIGHT VALVE
760: CROSS DICHROIC PRISM
770: PROJECTION LENS
780: LIGHT COMPOSING OPTICAL SYSTEM
800: PROJECTION SCREEN
911: LIGHT SOURCE
911x: OPTICAL AXIS
931: 1ST CROSS DICHROIC MIRROR
932: 2ND CROSS DICHROIC MIRROR
933: CONCAVE MIRROR
934: REFLECTING MIRROR
935: REFLECTING MIRROR
936: LIQUID CRYSTAL PANEL
937: REFLECTING MIRROR
938: REFLECTING MIRROR
939: LIQUID CRYSTAL PANEL
940: REFLECTING MIRROR
941: REFLECTING MIRROR
942: LIQUID CRYSTAL PANEL
943: PROJECTION LENS
944: PROJECTION SCREEN

DESCRIPTION OF THE PREFERRED EMBODIMENTS

Figure 1:
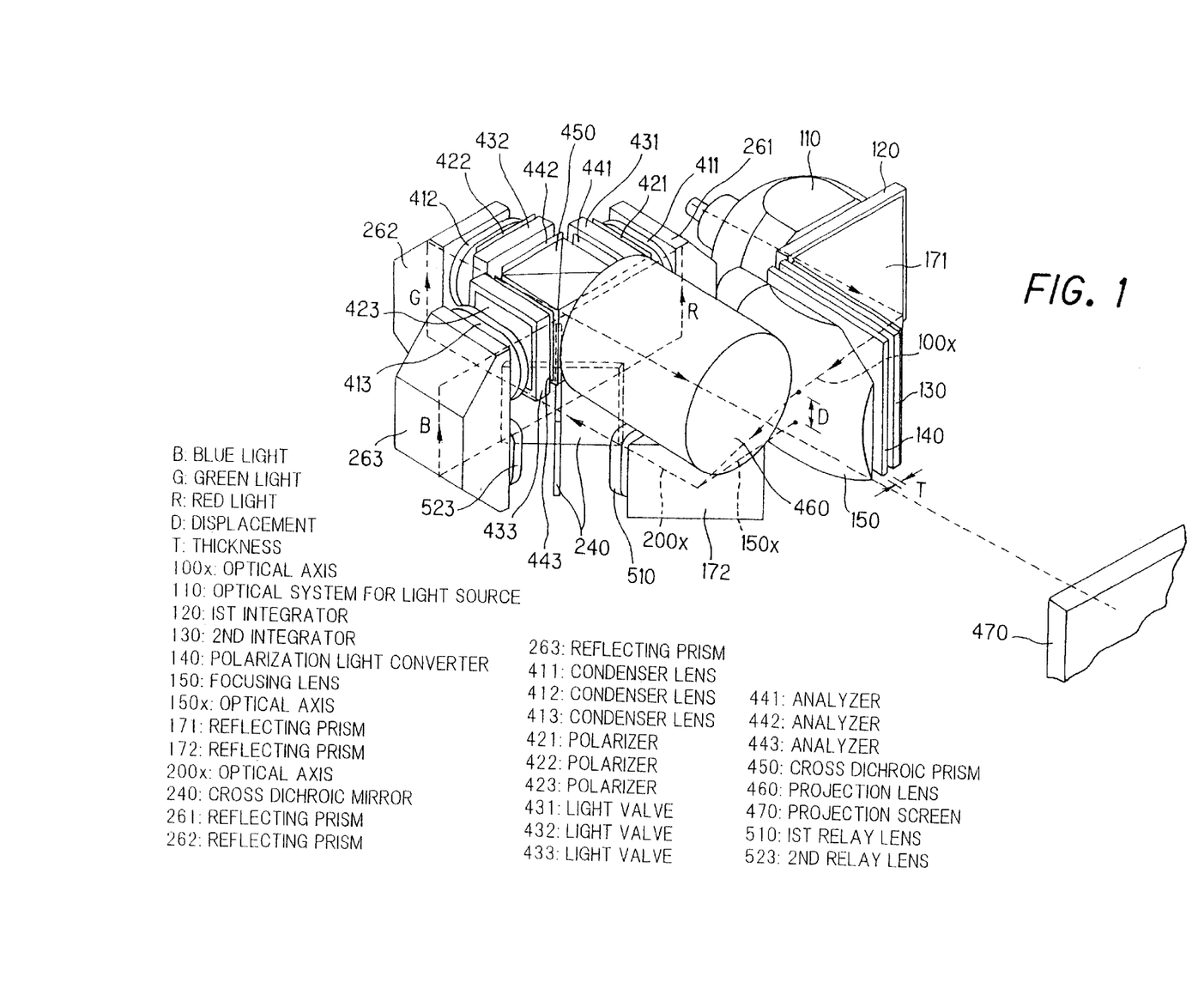
FIG. 1 is a perspective view illustrating the structure of the projector apparatus according to one preferred embodiment of the invention.
Figure 2:
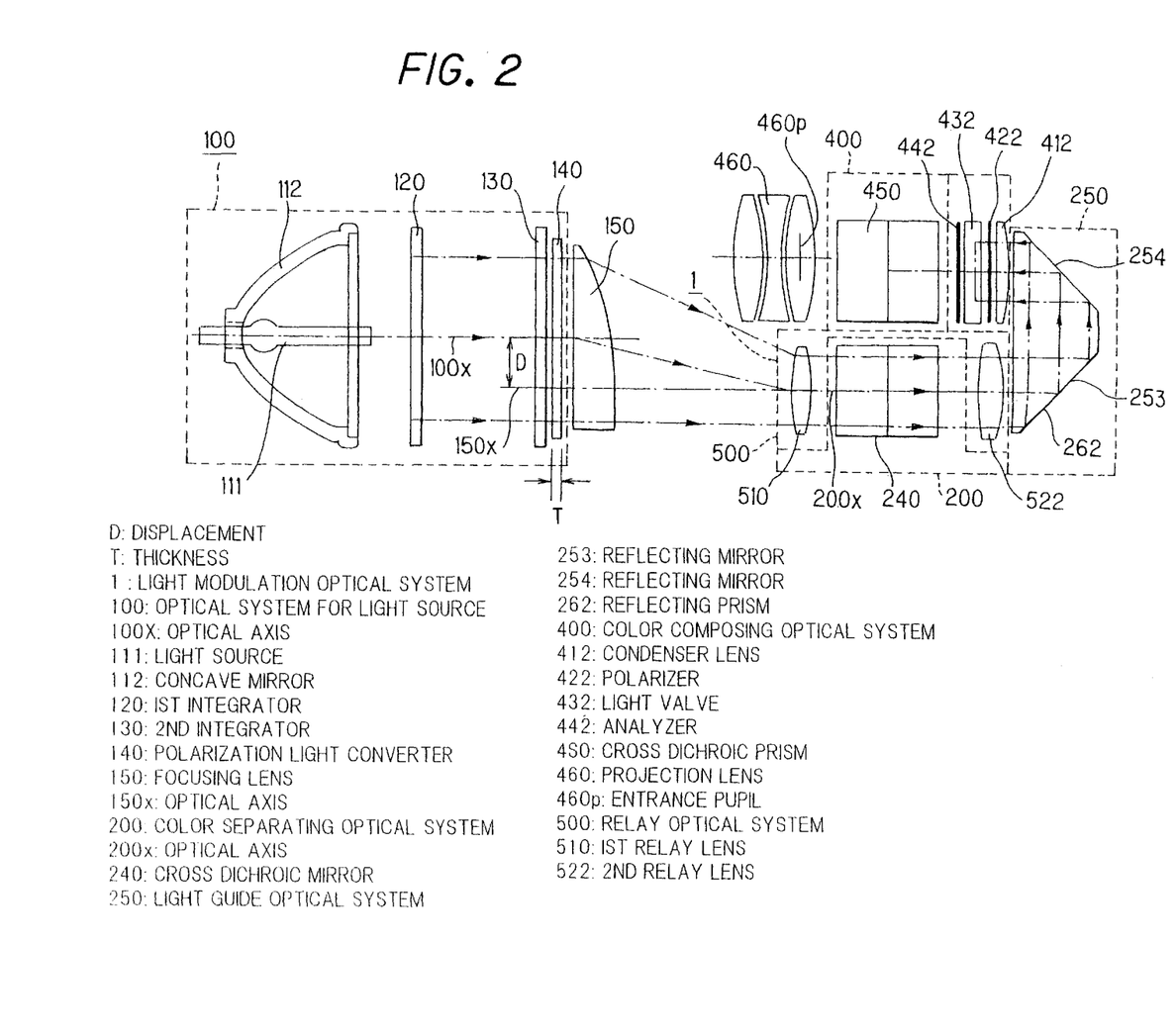
FIG. 2 is a partial side view illustrating the structure of the projector apparatus according to the preferred embodiment shown in FIG. 1.

FIG. 1 is a perspective view illustrating the structure of the projector apparatus according to one preferred embodiment of the invention, and FIG. 2 a partial side view illustrating the structure of the projector apparatus according to the preferred embodiment shown in FIG. 1. In FIG. 2, for facilitating the understanding of the invention, only the optical path of the green light component among the light components of the three primary colors is shown, and, in addition, reflecting prisms 171, 172 are not shown.

The projector apparatus shown in FIGS. 1 and 2 comprises a light source optical system 100 (FIG. 2), a focusing lens 150, a light separating optical system 200 (FIG. 2), a light guide optical system 250 (FIG. 2), light valves 431 to 433, a light composing optical system 400 (FIG. 2), a projection lens 460, and a relay optical system 500 (FIG. 2).

Among these elements, the light separating optical system 200 (FIG. 2), the light guide optical system 250 (FIG. 2), the light valves 431 to 433, the light composing optical system 400 (FIG. 2), and the relay optical system 500 (FIG. 2) constitute a light modulation optical system 1 as a whole.

The light source optical system 100 comprises: a light source 111, such as a halogen lamp; a concave mirror 112 for reflecting the light, emitted from the light source 111, in a specific direction; first and second integrators 120, 130 comprising a large number of minute rectangular lenses arranged in a planar matrix form; and a polarization light converter 140 which arranges the polarization direction of the incident light in a specific linear polarization direction and outputs the arranged light.

The focusing lens 150 is a lens which is disposed so that the optical axis 150$x$ thereof is displaced vertically and downward by D relative to the optical axis 100$x$ of the light source optical system 100. The focusing lens 150 transfers and applies the light from the light source optical system 100 to a first relay lens 511 in the relay optical system 500 which will be described below in more detail.

As shown in FIG. 1, a reflecting prism 171 is disposed between the first and second integrators 120, 130, and a reflecting prism 172 is disposed between the focusing lens 150 and the first relay lens 510. The reflecting prisms 171, 172 function to bend the optical paths to reduce the bottom area of the optical system. Reflecting mirrors may be substituted for these reflecting prisms 171, 172.

The light separating optical system 200 is disposed so that the incident light axis 200$x$ thereof is coincident with the optical axis 150$x$ of the focusing lens 150. The light separating optical system 200 comprises a cross-dichroic mirror 240 which separates the white light from the focusing lens 150 into light components of the three primary colors, that is, red light, green light, and blue light components. The cross-dichroic mirror 240 comprises a combination of a red reflection dichroic mirror and a blue reflection dichroic mirror which each are disposed so as to be inclined at 45 degrees to the input optical axis 200$x$ and to be disposed orthogonal to each other.

The light guide optical system 250 is disposed on each of the optical paths of the light components of the three primary colors, and comprises reflecting prisms 261 to 263 which totally reflect upward the respective light components of the three primary colors output from the cross-dichroic mirror 240 disposed in a crossed form. The reflecting prisms 261 to 263 respectively comprise a pair of reflecting mirrors 251 and 252, a pair of reflecting mirrors 253 and 254, and a pair of reflecting mirrors 255 and 256.

According to input image signals, light valves 431 to 433 modulate, pixel by pixel, the transmission intensity of the incident light for each of the light components of the three primary colors, that is, the red light, green light, and blue light components.

Further, condenser lenses 411 to 413 are disposed on the incident aide of the light valves 431 to 433 in order to input the light, incident to the light valves 431 to 433, into an entrance pupil 460$p$ of the projection lens 460 without any loss.

Polarizers 421 to 423 and analyzers 441 to 443 for inhibiting unnecessary polarized light components are disposed so as to sandwich the light valves 431 to 433 between the polarizers 421 to 423 and the analyzers 441 to 443.

The light composing optical system 400 comprises a cross-dichroic prism 450 for composing the light components modulated by the light valves 431 to 433. The cross-dichroic prism 450 comprises a combination of a prism having a red reflection dichroic mirror face and a prism having a blue reflection dichroic mirror face which are disposed so as to be inclined at 45 degrees to the incident optical axis and to be orthogonal to each other.

This cross-dichroic prism 450 in the light composing optical system 400 is disposed just above and adjacent to the cross-dichroic prism 240 in the light separating optical system 200.

The projection lens 460 projects the light composed in the cross-dichroic prism 450 onto a projection screen 470.

The relay optical system 500 comprises a first relay lens 510 and a second relay lens 521 to 523.

The first relay lens 510 is disposed in a first irradiation region between the focusing lens 150 and the cross-dichroic prism 240, and the white light output from the focusing lens 150 is transferred and applied to the first relay lens 510.

The second relay lenses 521 to 523 (the second relay lens 521 not shown) are disposed respectively on the optical paths of the light components or the three primary colors to transfer and apply the image formed on the first relay lens 510 as the first irradiation region to the light valves 431 to 433 as the second irradiation region, The features of this preferred embodiment are as follows.

(1) The optical axes 150$x$, 200$x$ of the optical systems provided behind the focusing lens 150 are displaced vertically and downward by D relative to the optical axis 100$x$ of the light source optical system 100.

(2) The first relay lens 510 is provided in the first irradiation region for the focusing lens 150.

(3) the second relay lenses 521 to 523 are provided for transferring applying the optical image in the first irradiation region near the first relay lens 510 onto the second irradiation region near the light valves 431 to 433.

Next, the principle of the operation of the projector apparatus according to the preferred embodiment will be described.

In the projector apparatus shown in FIGS. 1 and 2, light emitted from the light source 111 as a point light source and having heterogeneous illuminance distribution and random polarization components is focused on the concave mirror 112 and then enters the first integrator 120.

The light incident to the first integrator 120 are converted by a large number of minute rectangular lenses constituting the first integrator 120 to light components of a large number of minute rectangular regions which are then output.

The light output from the first integrator 120 is input into the second integrator 130 which applies the light to the first irradiation region near the first relay lens 510.

The light, which is random in polarization direction, output from the second integrator 130 enters the polarization light converter 140, where the light is arranged in a specific linear polarization direction and is then output.

The focusing lens 150 puts the illuminance distribution of the minute regions cut off in the first integrator 120 onto the first irradiation region near the first relay lens 510.

Thus, the light output from the light source 111 is homogeneously applied to the first irradiation region near the first relay lens 510 through the first and second integrators 120, 130 and the focusing lens 150.

Here the focusing lens 150 is disposed so that the optical axis 150$x$ of the focusing lens 150 is displaced vertically and downward by D relative to the optical axis 100$x$ of the light source optical system 100. More specifically, a satisfactory level of displacement D is provided which meets a relationship represented by formula D≦T wherein D represents the level of displacement of the optical axis 150x of the focusing lens 150 relative to the optical axis 100x of the light source optical system 100; and T represents the thickness of the polarization light converter 140.

Thus, as shown in FIG. 2, in the focusing lens 150 having an outer shape such that a part of a circle has been cut off, the optical path of the light from the light source 111 is refracted downward when it passes through the focusing lens 150 in its upper end, while the optical path passed through the focusing lens 150 in its lower end is not refracted. Therefore, the whole luminous flux can be applied without any loss to the incident face of the cross-dichroic prism 240 having a smaller area than the output face of the concave mirror 112.

According to this construction, the outer dimension of the first and second relay lenses 510 and 521 to 523 can be reduced by at least 50% as compared with the outer dimension of the focusing lens 150.

The white light from the first relay lens 510 enters the first cross-dichroic mirror 240, and is separated into light components of the three primary colors, that is, red light, green light, and blue light components.

The separated light components of the three primary colors are reflected by the reflecting prisms 261 to 253, and are applied by the second relay lenses 521 to 523 to the light valves 431 to 433 in the second irradiation region.

For the light components incident to the light valves 431 to 433, that is, the red light, green light, and blue light components, the transmission intensity is modulated, pixel by pixel, according to image signals, followed by light composing in the cross-dichroic prism 450.

The composed light is projected as a full-color image onto the projection screen 470 through the projection lens 460.

Here the condenser lenses 411 to 413 disposed on the incident side of the light valves 431 to 433 for the respective colors focus the incident light on the entrance pupil 460p of the projection lens 460 without any loss to enhance the illuminance of the projected image on the projection screen 470.

Further, for the polarizers 421 to 423 and the analyzers 441 to 443 disposed so as co sandwich the light valves 431 to 433 for the respective colors between the polarizers 421 to 423 and the analyzers 441 to 443, the coincidence of the polarization direction of the incident light to the polarization direction of the light valves 431 to 433 can enhance the illuminance of the projected image on the projection screen 470.

Thus, in the projector apparatus of the invention, the vertical height of the projector apparatus can be reduced to the sum of the height of the light separating optical system and the height of the light composing optical system.

Further, in the examples of the prior art, the distance between the first and second integrators is unconditionally determined by the dimension of the minute rectangular lenses of the first and second integrators. Therefore, in this case, the small-size construction of the first and second integrators and the efficiency for light utilization are traded off against each other. By contrast, according to the invention, by virtue of the provision of the first and second relay lenses to perform transfer and application of light, the distance between the first and second integrators is not limited. Therefore, both the small-size construction and the high efficiency for light utilization can be realized.

Transmission liquid crystal light valves have been used as the light modulator in the above preferred embodiment. Instead of the transmission liquid crystal light valve, it is possible to use liquid crystal light valves of types other than the transmission type or transmission light valves of types other than the liquid crystal type.

Further, in the above preferred embodiment, a cross-dichroic mirror has been used for light separation purposes, while a cross-dichroic prism has been used for light composing purposes. However, conversely, the crossdichroic mirror may be used for light composing purposes with the cross-dichroic prism being used for light separation purposes. Further, either a plurality of cross-dichroic mirrors or a plurality of cross-dichroic prisms may be used.

As is apparent from the forgoing description, the projector apparatus according to the invention has the following effects.

First, the size and thickness of the projector apparatus can be advantageously reduced.

This is because the adoption of a structure, wherein the light separating optical system and the light composing optical system have been put on top of the other vertically adjacent to each other, can reduce the bottom area of the whole optical system and can reduce the area necessary for installing the projector apparatus per se and, in addition, can reduce the height, for example, to about two-third of the liquid crystal projector apparatus according to the second example of the prior art.

The second advantage is that the illuminance of the projected image can be enhanced.

More specifically, the provision of the first and second relay leases enables the image formed on the first relay lens to be transferred and applied onto the light valves through the second relay lenses. Therefore, the distance between the focusing lens and the first relay lens can be set as desired independently of the outer dimension of the light valves. Thus, the first and second integrators can be disposed at any desired position, and the conversion efficiency of the polarization light converter can be enhanced.

The third advantage is to eliminate color shading of projected images.

This advantage is attributable to the fact that the optical path lengths for the three primary colors are identical to one another and, in addition, the construction of the optical systems provided on the respective optical paths are identical to one another.

The invention has been described in detail with particular reference to preferred embodiments, but it will be understood that variations and modifications can be effected within the scope of the invention as oat forth in the appended claims.

What is claimed is:

1. A projector apparatus, comprising:
   a light modulation optical system including a light separator which separates white light into a plurality of light components with respective wavelength bands, a light modulator which controls an intensity of each of said plurality of light components, and a light composer which composes the controlled plurality of light components, wherein the light separator and light composer are vertically stacked;
   a projection lens for projecting the controlled plurality of light components in the light modulation optical system;
   a light source optical system for outputting the white light, the light source optical system having an optical axis which is at least substantially parallel to, but displaced from, an optical axis of the light modulation optical system; and a focusing lens for focusing the white light output from the light source optical system, wherein said focusing lens has an optical axis coincident with the optical axis of the light separator so that light from the light source not coincident with the optical axis of the light separator is refracted to the optical axis of the light separator.

2. The projector apparatus according to claim 1, wherein the light source optical system comprises:

a light source;

an integrator for homogenizing an illuminance distribution of light output from the light source; and a polarization light converter which outputs the light, output from the integrator, as the white light polarized in the specific polarization direction.

3. The projector apparatus according to claim 2, wherein the integrator comprises:

a first integrator for cutting off the white light, which has been output from the light source, as light components of a large number of minute regions; and a second integrator for transferring and projecting the light which has been output from the first integrator.

4. A projector apparatus, comprising:

a light separating optical system which separates white light into a plurality of light components with respective wavelength bands;

a light guide optical system for bending optical paths of said plurality of light components, which have been output from the light separating optical system, so as to form a substantially U-shape;

a light composing optical system which is vertically stacked with respect to the light separation optical system and which composes the plurality of light components output from the light guide optical system;

light modulators which are disposed respectively on optical paths between the light separating optical system and the light composing optical system to control an intensity of the plurality of light components;

a projection lens for projecting the plurality of light components composed in the light composing optical system;

a light source optical system for outputting the white light which has been polarized in a specific polarization direction, the light source optical system having an optical axis which is at least substantially parallel to, but vertically displaced from, an optical axis of the light separating optical system; and a focusing lens for focusing the light output from the light source optical system, wherein said focusing lens has an optical axis coincident with the optical axis of the light separator so that light from the light source not coincident with the optical axis of the light separator is refracted to the optical axis of the light separator.

5. A projector apparatus, comprising:

a light separating optical system which separates white light into a plurality of light components with respective wavelength bands;

a light guide optical system for bending optical paths of said plurality of light components, which have been output from the light separating optical system, so as to form a substantially U-shape;

a light composing optical system which is disposed adjacent to the light separation optical system and which composes the plurality of light components output from the light guide optical system;

light modulators which are disposed respectively on optical paths between the light separating optical system and the light composing optical system to control an intensity of the plurality of light components;

a projection lens for projecting the plurality of light components composed in the light composing optical system;

a light source optical system for outputting the white light which has been polarized in a specific polarization direction, the light source optical system having an optical axis which is at least substantially parallel to an optical axis of the light separating optical system;

a focusing lens for focusing the light output from the light source optical system, wherein said focusing lens refracts the white light output along the optical axis of said light source optical system so that the white light propagates along the optical axis of the light separating optical system; and a relay optical system which includes:

a first relay lens disposed between the focusing lens and the light separating optical system; and a second relay lens disposed between the light separating optical system and the light modulators.

6. The projector apparatus according to claim 5, which further comprises:

a reflecting prism which is disposed between the light source optical system and the relay optical system and reflects the light, output from the light source optical system, toward the relay optical system.

7. The projector apparatus according to claim 5, which further comprises:

a reflecting mirror which is disposed between the light source optical system and the relay optical system and reflects the light, output from the light source optical system, toward the relay optical system.

8. The projector apparatus according to claim 4, further comprising a polarizing light converter for polarizing light output from the light source and wherein the light separating optical system is disposed so as to satisfy a relationship represented by formula $D \leq T$ wherein D represents a level of displacement of the optical axis of the focusing lens relative to an optical axis of the light source optical system, and T represents a thickness of the polarization light converter.

9. The projector apparatus according to claim 4, wherein the light separating optical system comprises a cross-dichroic mirror.

10. The projector apparatus according to claim 4, wherein the light separating optical system comprises a cross-dichroic prism.

11. The projector apparatus according to claim 4, wherein said light guide optical system comprises:

a reflecting prism which is disposed on the optical paths of said plurality of light components output from the light separating optical system and functions to bend the optical paths of said plurality of light components, output from the light separating optical system, so as to form the substantially U-shape.

12. The projector apparatus according to claim 4, wherein said light guide optical system comprises:

a first reflecting mirror which is disposed on the optical paths of the plurality of light components output from the light separating optical system and functions to reflect said plurality of light components, output from the light separating optical system, in parallel; and a second reflecting mirror which is disposed on the optical paths of the plurality of light components reflected by the first reflecting mirror and functions to reflect the plurality of light components reflected by the first reflecting mirror toward the light composing optical system.

13. The projector apparatus according to claim 4, wherein the light modulators each are a transmission light valve.

14. The projector apparatus according to claim 4, wherein the light modulators each are a liquid crystal light valve.

15. The projector apparatus according to claim 4, wherein the light modulators each are a transmission liquid crystal light valve.

16. The projector apparatus according to claim 4, wherein the light composing optical system comprises a cross-dichroic mirror.

17. The projector apparatus according to claim 4, wherein the light composing optical system comprises a cross-dichroic prism.

18. The projector apparatus according to claim 4, wherein the light composing optical system further comprises:

a condenser lens disposed on a light incidence side of the light modulators.

19. The projector apparatus according to claim 4, wherein the light composing optical system further comprises a polarizer and an analyzer disposed so as to sandwich the light modulator between the polarizer and the analyzer.

20. The projector apparatus according to claim 5, wherein the focusing lens functions to transfer and apply the white light output from the light source optical system onto the first relay lens.

21. The projector apparatus according to claim 5, wherein the second relay lens functions to transfer and apply light output from the first relay lens onto the light modulator.

22. A projector apparatus, comprising:

a light source including a focusing lens;

a light separator on an optical axis parallel to but displaced from an optical axis of the light source for separating light from the light source into red, green, and blue light beams, wherein the focusing lens has an optical axis coincident with the optical axis of the light separator so that light from the light source not coincident with the optical axis of the light separator is refracted to the optical axis of the light separator;

a plurality of light modulators each of which modulates a respective one of said red, green, and blue light beams;

a light combiner for combining the modulated light beams output from the plurality of light modulators into a combined beam; and a projection lens for projecting the combined beam, wherein optical path lengths between the light separator and the light combiner for each of the red, green, and blue beams is a same length.

23. The projector apparatus according to claim 22, wherein said focusing lens has an outer shape of part of a circle has been cut off, and wherein light from said light source is progressively refracted by said focusing lens from that portion which is in alignment with the optical axis of the separator, passing the light from the light source without refraction, to an outer edge of the focusing lens.

24. The projector apparatus according to claim 22, further comprising:

a polarization light converter for polarizing light output from the light source, wherein the light separator is disposed so as to satisfy a relationship represented by formula $D \leq T$, wherein D represents a level of displacement of an optical axis of the focusing lens relative to the polarization light converter.

25. The projector apparatus according to claim 22, further comprising:

a first relay lens between the light source and the light separator; and a second relay lens between the light separator and the light combiner.

* * * * *